(12) United States Patent
Prevost

(10) Patent No.: US 10,767,128 B2
(45) Date of Patent: Sep. 8, 2020

(54) COPOLYMER SUITABLE FOR USE AS A DETERGENT ADDITIVE FOR FUEL

(71) Applicant: TOTAL MARKETING SERVICES, Puteaux (FR)

(72) Inventor: Julie Prevost, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 16/319,788

(22) PCT Filed: Jul. 20, 2017

(86) PCT No.: PCT/FR2017/051976
§ 371 (c)(1),
(2) Date: Jan. 22, 2019

(87) PCT Pub. No.: WO2018/015666
PCT Pub. Date: Jan. 25, 2018

(65) Prior Publication Data
US 2019/0169516 A1 Jun. 6, 2019

(30) Foreign Application Priority Data
Jul. 21, 2016 (FR) ..................................... 16 56974

(51) Int. Cl.
| | |
|---|---|
| *C10L 1/236* | (2006.01) |
| *C10L 1/196* | (2006.01) |
| *C10L 1/222* | (2006.01) |
| *C08F 220/60* | (2006.01) |
| *C10L 10/04* | (2006.01) |
| *C10L 10/18* | (2006.01) |
| *C08F 220/36* | (2006.01) |
| *C08F 218/04* | (2006.01) |
| *C08F 216/14* | (2006.01) |
| *C10L 10/06* | (2006.01) |
| *C10L 10/02* | (2006.01) |
| *C10L 1/197* | (2006.01) |
| *C08F 293/00* | (2006.01) |
| *C10L 1/195* | (2006.01) |
| *C08F 220/54* | (2006.01) |
| *C10L 1/14* | (2006.01) |
| *C08F 226/02* | (2006.01) |
| *C08F 8/44* | (2006.01) |
| *C10L 1/2383* | (2006.01) |
| *C08F 220/34* | (2006.01) |

(52) U.S. Cl.
CPC .............. *C10L 1/2364* (2013.01); *C08F 8/44* (2013.01); *C08F 216/14* (2013.01); *C08F 218/04* (2013.01); *C08F 220/36* (2013.01); *C08F 220/54* (2013.01); *C08F 220/60* (2013.01); *C08F 226/02* (2013.01); *C08F 293/005* (2013.01); *C10L 1/146* (2013.01); *C10L 1/195* (2013.01); *C10L 1/1955* (2013.01); *C10L 1/1963* (2013.01); *C10L 1/1973* (2013.01); *C10L 1/2222* (2013.01); *C10L 1/236* (2013.01); *C10L 1/2366* (2013.01); *C10L 10/02* (2013.01); *C10L 10/04* (2013.01); *C10L 10/06* (2013.01); *C10L 10/18* (2013.01); *C08F 220/34* (2013.01); *C08F 2438/01* (2013.01); *C08F 2438/03* (2013.01); *C10L 1/2383* (2013.01); *C10L 2230/22* (2013.01); *C10L 2270/023* (2013.01); *C10L 2270/026* (2013.01)

(58) Field of Classification Search
CPC combination set(s) only.
See application file for complete search history.

(56) References Cited

U.S. PATENT DOCUMENTS

| | | |
|---|---|---|
| 3,018,250 A | 1/1962 | Anderson et al. |
| 3,048,479 A | 8/1962 | Ilnyckyj et al. |
| 3,226,373 A | 12/1965 | Fareri et al. |
| 3,361,673 A | 1/1968 | Fareri et al. |
| 3,627,838 A | 12/1971 | Ilnyckyj et al. |
| 3,790,359 A | 2/1974 | Feldman |
| 3,961,961 A | 6/1976 | Rich |
| 4,171,959 A | 10/1979 | Vartanian |
| 4,511,369 A | 4/1985 | Denis et al. |
| 4,664,676 A | 5/1987 | Denis et al. |
| 4,900,332 A | 2/1990 | Denis et al. |

(Continued)

FOREIGN PATENT DOCUMENTS

| | | |
|---|---|---|
| EP | 0112195 A1 | 6/1984 |
| EP | 0172758 A1 | 2/1986 |

(Continued)

OTHER PUBLICATIONS

K. Matyjaszewski et al; "Macromolecular Engineering by Atom Transfer Radical Polymerization"; Journal of the American Chemical Society; 136; 2014; pp. 6513-6533.

(Continued)

*Primary Examiner* — Ellen M McAvoy
*Assistant Examiner* — Chantel L Graham
(74) *Attorney, Agent, or Firm* — Oliff PLC

(57) ABSTRACT

A copolymer obtained by copolymerization of at least: an apolar monomer ($m_a$) with the following formula (I), where u=0 or I, w=0 or I, E=-0- or —NH(Z)—, or —O—CO—, or —NH—CO— or —CO—NH—, wherein Z is H or an alkyl group, and G is a group selected among an alkyl, an aromatic ring and an arylalkyl; and a polar monomer ($m_b$) selected among those of the following formula (II), wherein t=0 or I, Q is selected among the oxygen atom and the —NR'— group, wherein R' is selected among a hydrogen atom and hydrocarbon chains, and R is a hydrocarbon chain substituted by at least one quaternary ammonium group and optionally one or more hydroxyl groups. The invention also relates to the use of such a copolymer as a detergent additive in a liquid fuel of an internal combustion engine.

13 Claims, No Drawings

(56) References Cited

U.S. PATENT DOCUMENTS

| | | | |
|---|---|---|---|
| 5,011,504 A * | 4/1991 | Henry | C10L 1/143 44/392 |
| 5,863,303 A | 1/1999 | Yamamoto et al. | |
| 6,511,520 B1 | 1/2003 | Eber et al. | |
| 2002/0014034 A1 | 2/2002 | Bernasconi et al. | |
| 2005/0223629 A1 * | 10/2005 | Sutkowski | C10L 1/143 44/397 |
| 2013/0104826 A1 | 5/2013 | Burgess et al. | |
| 2013/0274369 A1 * | 10/2013 | Millard | C08F 222/38 522/175 |
| 2015/0315506 A1 | 11/2015 | Dubois | |
| 2016/0160144 A1 | 6/2016 | Boehnke et al. | |

FOREIGN PATENT DOCUMENTS

| | | |
|---|---|---|
| EP | 0261957 A2 | 3/1988 |
| EP | 0271385 A1 | 6/1988 |
| EP | 0291367 A1 | 11/1988 |
| EP | 0736590 A2 | 10/1996 |
| EP | 0860494 A1 | 8/1998 |
| EP | 0861882 A1 | 9/1998 |
| EP | 1 533 359 A1 | 5/2005 |
| FR | 2528051 A1 | 12/1983 |
| FR | 2528423 A1 | 12/1983 |
| FR | 2772783 A1 | 6/1999 |
| FR | 2772784 A1 | 6/1999 |
| GB | 949981 A | 2/1964 |
| GB | 2121808 A | 1/1984 |
| NZ | 202674 A | 5/1986 |
| WO | 9406894 A1 | 3/1994 |
| WO | 9417160 A1 | 8/1994 |
| WO | 98/04656 A1 | 2/1998 |
| WO | 2006/135881 A2 | 12/2006 |
| WO | 2014/029770 A1 | 2/2014 |
| WO | 2015/184301 A2 | 12/2015 |

OTHER PUBLICATIONS

K. Matyjaszewski et al; "Atom Transfer Radical Polymerization (ATRP): Current Status and Future Perspectives"; Macromolecules; 45; 2012; pp. 4015-4039.

Moad et al; "Living Radical Polymerization by the RAFT Process"—A Thrid Update; Australian Journal of Chemistry; 2012; 65; pp. 985-1076.

M. Arondel et al; "Evaluating Injector Fouling in Direct Injection Spark Ignition Engines—A New Engine Test Procedure to Evaluate the Deposit Control Performance of Base Fuels and Additivated Fuels", Conventional and future energy for automobiles, 10th International Colloquium; Jan. 20-22, 2015; pp. 375-386.

Nov. 14, 2017 International Search Report issued in International Patent Application PCT/FR2017/051976.

Nov. 14, 2017 Written Opinion issued in International Patent Application PCT/FR2017/051976.

* cited by examiner

COPOLYMER SUITABLE FOR USE AS A DETERGENT ADDITIVE FOR FUEL

The present invention relates to a copolymer and to the use thereof as detergent additive in a liquid fuel for an internal combustion engine. The invention also relates to a process for keeping clean and/or for cleaning at least one of the internal parts of an internal combustion engine.

PRIOR ART

Liquid fuels for internal combustion engines contain components that can degrade during the functioning of the engine. The problem of deposits in the internal parts of combustion engines is well known to motorists. It has been shown that the formation of these deposits has consequences on the performance of the engine and especially has a negative impact on consumption and particle emissions. Progress in the technology of fuel additives has made it possible to face up to this problem. "Detergent" additives used in fuels have already been proposed to keep the engine clean by limiting deposits ("keep-clean" effect) or by reducing the deposits already present in the internal parts of the combustion engine ("clean-up" effect). Mention may be made, for example, of U.S. Pat. No. 4,171,959 which describes a detergent additive for petrol fuel containing a quaternary ammonium function. WO 2006/135881 describes a detergent additive containing a quaternary ammonium salt used for reducing or cleaning deposits, especially on the inlet valves. However, engine technology is in constant evolution and the stipulations for fuels must evolve to cope with these technological advances of combustion engines. In particular, the novel petrol or diesel direct-injection systems expose the injectors to increasingly severe pressure and temperature conditions, which promotes the formation of deposits. In addition, these novel injection systems have more complex geometries to optimize the spraying, especially, from more numerous holes having smaller diameters, but which, on the other hand, induce greater sensitivity to deposits. The presence of deposits may impair the combustion performance and especially increase pollutant emissions and particle emissions. Other consequences of the excessive presence of deposits have been reported in the literature, such as the increase in fuel consumption and driveability problems.

US 2013/274369 A1 describes water-soluble cationic copolymers derived from N-vinyl amide monomers and from ethylenically unsaturated compounds and bearing a cationic group and also the use thereof as flocculant.

Preventing and reducing deposits in these novel engines are essential for optimum functioning of modern engines. There is thus a need to propose detergent additives for fuel which promote optimum functioning of combustion engines, especially for novel engine technologies.

There is also a need for a universal detergent additive that is capable of acting on deposits irrespective of the technology of the engine and/or the nature of the fuel.

Another important problem associated with liquid fuels for internal combustion engines is the presence of residual water within these fuels. Indeed, due to the process used for extracting the crude oil but also because of the condensation of water within the cold fuel during transport thereof and storage thereof, fuels comprise a variable amount of water that may range from a few parts per million to several percent by weight, relative to the total weight of the fuel. The presence of this residual water generally leads to the formation of stable emulsions which, being suspended within the fuel, are the cause of numerous problems that arise during the transport and/or during the combustion of these fuels. For example, these emulsions may cause obstruction of the engine's filters or else accelerate the corrosion of the engine.

The combination of dicarboxylic acid compounds substituted with a hydrocarbyl group, and especially polyisobutylsuccinic acid, with a detergent additive in order to improve the separation of the water included in the fuel and from the fuel is known from document US 2016/0160144. The combination of two quaternary ammonium salts and a demulsifier in order to improve the separation of the water present in the fuel from the fuel itself is also known from document WO 2015/184301.

There is a need to propose an additive concentrate for fuel, having both good detergent and demulsifying properties, in particular for diesel fuels.

SUBJECT OF THE INVENTION

The subject of the invention relates to novel copolymers. The Applicant has discovered that the copolymers according to the invention have noteworthy properties as detergent additive in liquid fuels for internal combustion engines. The copolymers according to the invention used in these fuels make it possible to keep the engine clean, in particular by limiting or preventing the formation of deposits ("keep-clean" effect) or by reducing the deposits already present in the internal parts of the combustion engine ("clean-up" effect).

The advantages associated with the use of such copolymers according to the invention are:
optimum functioning of the engine,
reduction of the fuel consumption,
better driveability of the vehicle,
reduced pollutant emissions, and
savings due to less engine maintenance.

The subject of the present invention relates to a copolymer obtained by copolymerization of at least:
a non-polar monomer ($m_a$) corresponding to the following formula (I)

with
u=0 or 1,
w=0 or 1,
E=—O— or —NH(Z)—, or —O—CO—, or —NH—CO— or —CO—NH—, with Z representing H or a C1-C6 alkyl group, it being understood that when E=—O—CO— E is connected to the vinyl carbon by the oxygen atom, G represents a group chosen from a C1-C34 alkyl, an aromatic ring, an aralkyl comprising at least one aromatic ring and at least one C1-C34 alkyl group, and a polar monomer ($m_b$) chosen from those of the following formula (II):

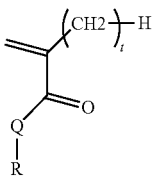

wherein
t=0 or 1
Q is chosen from an oxygen atom and a group —NR'— with R' being chosen from a hydrogen atom and $C_1$ to $C_{12}$ hydrocarbon-based chains,
R is a $C_1$ to $C_{34}$ hydrocarbon-based chain substituted with at least one quaternary ammonium group and optionally one or more hydroxyl groups.

According to an advantageous embodiment, the group E of the non-polar monomer ($m_a$) is —O—.

According to another advantageous embodiment, the group E of the non-polar monomer ($m_a$) is —NH(Z)— with Z representing H or a C1-C6 alkyl group.

According to yet another advantageous embodiment, the group E of the non-polar monomer ($m_a$) is —O—CO— in which E is connected to the vinyl carbon by the oxygen atom.

Advantageously, the non-polar monomer ($m_a$) is such that w is equal to 0.

Preferentially, the group G of the non-polar monomer ($m_a$) is chosen from a C4-C34 alkyl, an aromatic ring, an aralkyl comprising at least one aromatic ring and at least one C1-C34, preferably C4-C34 alkyl group.

According to a first preferred variant, the group G of the non-polar monomer ($m_a$) is a C4-C34, preferably C4-C30 alkyl.

According to another preferred variant, the group G of the non-polar monomer ($m_a$) is an aralkyl comprising at least one aromatic ring and at least one C4-30 alkyl group.

Advantageously, in the polar monomer ($m_b$), the quaternary ammonium group is chosen from pyrrolinium, pyridinium, imidazolium, triazolium, triazinium, oxazolium and isoxazolium quaternary ammoniums.

According to one variant, the quaternary ammonium group is chosen from trialkylammonium, iminium, amidinium, formamidinium, guanidinium and biguanidinium quaternary ammoniums, preferably trialkylammonium quaternary ammoniums.

According to a preferred particular embodiment, the polar monomer ($m_b$) is represented by one of the following formulae (III) and (IV):

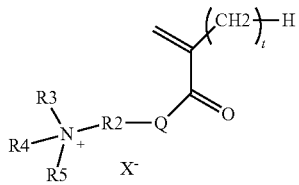

(III)

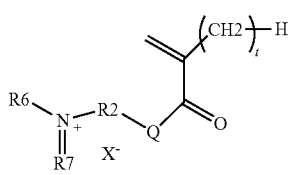

(IV)

wherein
t and Q are as defined in formula (II) above,
$X^-$ is chosen from hydroxide and halide ions and organic anions,
$R_2$ is chosen from $C_1$ to $C_{34}$ hydrocarbon-based chains, optionally substituted with at least one hydroxyl group,
$R_3$, $R_4$ and $R_5$ are identical or different and chosen independently from $C_1$ to $C_{18}$ hydrocarbon-based chains, it being understood that the alkyl groups $R_3$, $R_4$ and $R_5$ may contain one or more groups chosen from: a nitrogen atom, an oxygen atom and a carbonyl group and that the groups $R_3$, $R_4$ and $R_5$ may be connected together in pairs to form one or more rings,
$R_6$ and $R_7$ are identical or different and chosen independently from $C_1$ to $C_{18}$ hydrocarbon-based chains, it being understood that the groups $R_6$ and $R_7$ may contain one or more groups chosen from: a nitrogen atom, an oxygen atom and a carbonyl group and that the groups $R_6$ and $R_7$ may be connected together to form a ring.

Advantageously, the group $R_2$ is represented by one of the formulae (V) and (VI) below:

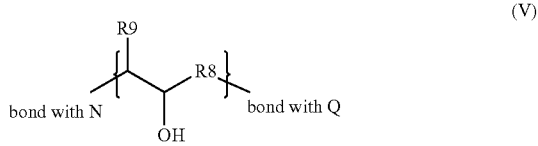

(V)

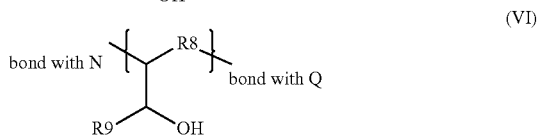

(VI)

in which
$R_8$ is chosen from $C_1$ to $C_{32}$ hydrocarbon-based chains,
$R_9$ is chosen from hydrogen and $C_1$ to $C_6$ alkyl groups.

According to a particular embodiment, the monomer ($m_b$) is obtained by the reaction:
of a tertiary amine of formula $NR_3R_4R_5$ or $R_6N=R_7$ in which $R_3$, $R_4$, $R_5$, $R_6$ and $R_7$ are as defined above in formulae (III) and (IV), and
of a (meth)acrylate or (meth)acrylamide intermediate monomer ($m_i$) of formula (VII) below:

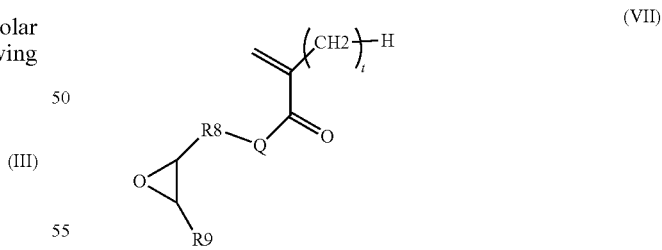

(VII)

in which
Q, t, $R_8$ and $R_9$ are as defined in formulae (II), (V) and (VI) above.

According to a preferred embodiment, the copolymer is chosen from block copolymers and random copolymers.

According to a particularly preferred embodiment, the copolymer is a block copolymer.

In particular, the block copolymer comprises at least:
a block A consisting of a chain of structural units derived from one or more non-polar monomers chosen from the non-polar monomers ($m_a$) of formula (I), and a block B consisting of a chain of structural units derived from one or more polar monomers chosen from the polar monomers ($m_b$).

The copolymer advantageously comprises at least one sequence of blocks AB, ABA or BAB in which said blocks A and B form a sequence without the presence of an intermediate block of different chemical nature.

According to a particular development, the block copolymer is obtained by sequenced polymerization, optionally followed by one or more post-functionalizations.

The subject of the present invention also relates to a process for preparing a copolymer as described above, wherein the block B is obtained by post-functionalization of an intermediate polymer Pi resulting from the polymerization of an intermediate (meth)acrylate or (meth)acrylamide monomer ($m_i$) of formula (VII) defined above, and wherein said post-functionalization corresponds to the reaction of said intermediate polymer Pi with a tertiary amine $NR_3R_4R_5$ or $R_6N=R_7$, in which $R_3$, $R_4$, $R_5$, $R_6$ and $R_7$ are as defined above in formulae (III) and (IV).

Advantageously, the intermediate polymer Pi also comprises at least one block A as defined above.

According to a particular embodiment, the block copolymer is obtained by sequenced polymerization, optionally followed by one or more post-functionalizations.

According to a particular embodiment, the copolymer is a copolymer comprising at least one sequence of blocks AB, ABA or BAB in which said blocks A and B form a sequence without the presence of an intermediate block of different chemical nature.

The subject of the present invention also relates to a concentrate for fuel comprising one or more copolymers as described above, optionally mixed with an organic liquid, said organic liquid being inert with respect to the copolymer(s) and miscible with said fuel. Preferably, the concentrate is mixed with the organic liquid.

According to a certain embodiment, the concentrate for fuel also comprises at least one compound chosen from succinimides substituted with a hydrocarbon-based chain, preferably polyisobutene succinimides, said organic liquid also being inert with respect to said compound.

The subject of the present invention also relates to a fuel composition comprising:
(1) a fuel derived from one or more sources chosen from the group consisting of mineral, animal, plant and synthetic sources, and
(2) one or more copolymers as defined previously.

Advantageously, the composition comprises at least 5 ppm of copolymer(s) (2).

According to a particular embodiment, the fuel (1) is chosen from hydrocarbon-based fuels, fuels that are not essentially hydrocarbon-based, and mixtures thereof.

According to a certain embodiment, the fuel composition comprises at least one compound chosen from succinimides substituted with a hydrocarbon-based chain, preferably polyisobutene succinimides.

The subject of the present invention also relates to the use of one or more copolymers as defined above as detergent additive in a liquid fuel for internal combustion engines, said copolymer being used alone, as a mixture or in the form of a concentrate as defined above.

According to a particular embodiment, the copolymer is used in the liquid fuel for keeping clean and/or cleaning at least one of the internal parts of said internal combustion engine.

According to a preferred particular embodiment, the copolymer is used in the liquid fuel for limiting or preventing the formation of deposits in at least one of the internal parts of said engine and/or for reducing the existing deposits in at least one of the internal parts of said engine.

According to a particular embodiment, the copolymer is used for reducing the fuel consumption of the internal combustion engine.

According to a particular embodiment, the copolymer is used for reducing the emissions of pollutants, in particular the emissions of particles from the internal combustion engine.

According to a particular embodiment, the internal combustion engine is a spark ignition engine.

Advantageously, the deposits are located in at least one of the internal parts chosen from the engine intake system, the combustion chamber and the fuel injection system.

According to another particular embodiment, the internal combustion engine is a diesel engine, preferably a direct-injection diesel engine.

Advantageously, the copolymer is used to prevent and/or reduce the formation of deposits in the injection system of the diesel engine.

In particular, the copolymer is used to prevent and/or reduce the formation of coking-related deposits and/or deposits of soap and/or lacquering type.

According to a particular embodiment, the copolymer is used to reduce and/or prevent power loss due to the formation of said deposits in the internal parts of a direct-injection diesel engine, said power loss being determined according to the standardized engine test method CEC F-98-08.

According to a particular embodiment, the copolymer is used to reduce and/or prevent restriction of the fuel flow emitted by the injector during the functioning of said diesel engine, said flow restriction being determined according to the standardized engine test method CEC F-23-1-01.

The invention also relates to the use of one or more copolymers as defined above as a mixture with at least one compound chosen from succinimides substituted with a hydrocarbon-based chain, preferably polyisobutene succinimides, or in the form of a concentrate as defined above in order to improve the separation of water and fuel when the latter contains water.

The invention also relates to a process for keeping clean and/or for cleaning at least one of the internal parts of an internal combustion engine, comprising at least the following steps:
  the preparation of a fuel composition by supplementation of a fuel with one or more copolymers as described above, and
  combustion of said fuel composition in said internal combustion engine.

According to a first embodiment, the internal combustion engine is a spark ignition engine.

Advantageously, according to this embodiment, the internal part of the spark ignition engine that is kept clean and/or cleaned is chosen from the engine intake system, in particular the intake valves (IVD), the combustion chamber (CCD or TCD) and the fuel injection system, in particular the injectors of an indirect injection system (PFI) or the injectors of a direct injection system (DISI).

According to another embodiment, the internal combustion engine is a diesel engine, preferably a direct-injection diesel engine.

Advantageously, according to this embodiment, the internal part of the diesel engine that is kept clean and/or cleaned is the injection system of the diesel engine.

The copolymers according to the invention are advantageous in that they are efficient as detergent additive for a wide range of liquid fuels and/or for one or more types of engine specification and/or against one or more types of deposit which become formed in the internal parts of internal combustion engines.

In addition, the concentrate according to the invention comprising at least one succinimide compound, in particular a polyisobutene succinimide, is noteworthy in that it is particularly effective for engine cleanliness and demulsification of fuels containing water.

DETAILED DESCRIPTION

Other advantages and characteristics will emerge more clearly from the description that follows. The particular embodiments of the invention are given as nonlimiting examples.

According to a particular embodiment, a copolymer is obtained by copolymerization of at least one non-polar monomer ($m_a$) and of at least one polar monomer ($m_b$).

According to one embodiment, the copolymer is chosen from block or random copolymers.

According to a particularly preferred embodiment, the copolymer is a block copolymer.

The non-polar monomer ($m_a$) corresponds to the following formula (I):

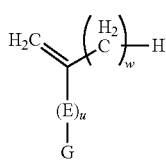

with
u=0 or 1
w=0 or 1

Advantageously, the non-polar monomer ($m_a$) is such that w=0.

The group E of the non-polar monomer ($m_a$) is chosen from
E=—O—,
E=—NH(Z)— with Z representing H or a linear or branched, cyclic or acyclic, preferably acyclic, C1-C6 alkyl group,
E=—O—CO—, it being understood that E is then connected to the vinyl carbon by the oxygen atom,
E=—NH—CO—, and
E=—CO—NH—.

According to a first variant, the non-polar monomer ($m_a$) is chosen from those for which u=0. Preferentially, and according to this first variant, the copolymer is a block copolymer.

According to another variant, the non-polar monomer ($m_a$) is chosen from those for which u=1.

According to a preferred variant, the non-polar monomer ($m_a$) is chosen from those for which: u=1, and the group E is chosen from
E=—O—,
E=—NH(Z)— with Z representing H or a linear or branched, cyclic or acyclic, preferably acyclic, C1-C6 alkyl group, preferably CH3, and
E=—O—CO—, in which E is connected to the vinyl carbon by the oxygen atom.

According to a further preferred variant, the non-polar monomer ($m_a$) is chosen from those for which:

u=1, and the group E is chosen from:
E=—O—, and
E=—O—CO— in which E is connected to the vinyl carbon by the oxygen atom.

The group (G) of the non-polar monomer ($m_a$) may be a C1-C34 alkyl, preferably a C4-C30, better still C6-C24, even more preferentially C8 to C18 alkyl radical. The alkyl radical is a linear or branched, cyclic or acyclic, preferably acyclic radical. This alkyl radical may comprise a linear or branched part and a cyclic part.

The group (G) of the non-polar monomer ($m_a$) is advantageously a linear or branched, preferably linear, acyclic C1-C34 alkyl, preferably a C4-C30, better still C6-C24, even more preferentially C8 to C18 alkyl radical.

Mention may be made, nonlimitingly, of alkyl groups such as octyl, decyl, dodecyl, 2-ethylhexyl, isooctyl, isodecyl and isododecyl.

Among the vinyl alkyl ester monomers, mention may for example be made of vinyl octanoate, vinyl decanoate, vinyl dodecanoate, vinyl tetradecanoate, vinyl hexadecanoate, vinyl octadecanoate, vinyl docosanoate, vinyl 2-ethylhexanoate.

The group (G) of the non-polar monomer ($m_a$) may also be an aromatic ring, preferably a phenyl or aryl group. Among the aromatic groups, mention may be made, nonlimitingly, of the phenyl or naphthyl group, preferably the phenyl group.

The group (G) of the non-polar monomer ($m_a$) may, according to another preferred variant, be an aralkyl comprising at least one aromatic ring and at least one C1-C34 alkyl group. Preferably, according to this variant, the group (G) is an aralkyl comprising at least one aromatic ring and one or more C4-C30, advantageously C6-C24, even more preferentially C8 to C18 alkyl groups.

The aromatic ring may be monosubstituted or substituted on several of its carbon atoms. Preferably, the aromatic ring is monosubstituted.

The C1-C34 alkyl group may be in the ortho, meta or para position on the aromatic ring, preferably in the para position.

The alkyl radical is a linear or branched, cyclic or acyclic, preferably acyclic radical.

The alkyl radical is preferably a linear or branched, preferably linear, acyclic radical.

The aromatic ring may be directly connected to the group E or to the vinyl carbon but it may also be connected via an alkyl substituent.

Mention may be made, as example of group G, of a benzyl group substituted in the para position with a C4-C30 alkyl group.

Preferably, according to this variant, the group (G) of the non-polar monomer ($m_a$) is an aralkyl comprising at least one aromatic ring and at least one C4-C30, advantageously C6-C24, even more preferentially C8 to C18 alkyl group.

The polar monomer ($m_b$) is chosen from those of formula (II):

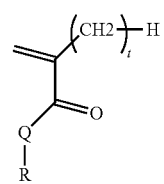

wherein
t=0 or 1, preferably t=0,
Q is chosen from an oxygen atom and a group —NR'— with R' being chosen from a hydrogen atom and $C_1$ to $C_{12}$, preferably $C_1$ to $C_6$ hydrocarbon-based chains, said chains being linear or branched, cyclic or acyclic, preferably acyclic. Q is preferably chosen from an oxygen atom and an —NH— group.

R is a $C_1$ to $C_{34}$, preferably $C_1$ to $C_{18}$, more preferentially $C_1$ to $C_{10}$ hydrocarbon-based chain, which is linear or branched, cyclic or acyclic, preferably acyclic, substituted with at least one quaternary ammonium group preferably having from 4 to 50 atoms and optionally one or more hydroxyl groups.

According to a particular embodiment, the group R comprises a quaternary ammonium group and one or more hydroxyl groups.

According to one variant, the group R is chosen from groups having at least one quaternary ammonium function obtained by quaternization of a primary, secondary or tertiary amine according to any known process.

The group R may be chosen in particular from groups having at least one quaternary ammonium function, obtained by quaternization of at least one amine, imine, amidine, guanidine, aminoguanidine or biguanidine function; the heterocyclic groups having from 3 to 34 atoms and at least one nitrogen atom.

Advantageously, the group R is chosen from groups having at least one quaternary ammonium function obtained by quaternization of a tertiary amine.

According to a particular embodiment, the polar monomer ($m_b$) is represented by one of the following formulae (III) and (IV):

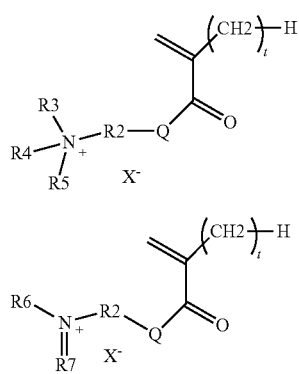

wherein
t and Q are as described above,
$X^-$ is chosen from hydroxide and halide ions and organic anions, in particular the acetate ion
$R_2$ is chosen from $C_1$ to $C_{34}$ and preferably $C_1$ to $C_{18}$ hydrocarbon-based chains, which are cyclic or acyclic, linear or branched, optionally substituted with at least one hydroxyl group; preferably, $R_2$ is chosen from alkyl groups, optionally substituted with at least one hydroxyl group,
$R_3$, $R_4$ and $R_5$ are identical or different and chosen independently from linear or branched, cyclic or acyclic $C_1$ to $C_{18}$ and preferably $C_1$ to $C_{12}$ hydrocarbon-based chains, it being understood that the alkyl groups $R_3$, $R_4$ and $R_5$ may contain one or more nitrogen and/or oxygen atoms and/or carbonyl groups and may be connected together in pairs to form one or more rings,
$R_6$ and $R_7$ are identical or different and chosen independently from linear or branched, cyclic or acyclic $C_1$ to $C_{18}$ and preferably $C_1$ to $C_{12}$ hydrocarbon-based chains, it being understood that the groups $R_6$ and $R_7$ may contain one or more nitrogen and/or oxygen atoms and/or carbonyl groups and may be connected together to form a ring.

The nitrogen and/or oxygen atom(s) may be present in the groups $R_3$, $R_4$ and $R_5$ in the form of ether bridges or amine bridges or in the form of an amine or hydroxyl substituent.

The organic anions of the group X— are generally conjugate bases of organic acids, preferably conjugate bases of carboxylic acids, in particular acids chosen from cyclic or acyclic monocarboxylic and polycarboxylic acids. Preferably, the organic anions of the group X— are chosen from conjugate bases of saturated acyclic or aromatic cyclic carboxylic acids. Examples that will be mentioned include methanoic acid, acetic acid, adipic acid, oxalic acid, malonic acid, succinic acid, citric acid, benzoic acid, phthalic acid, isophthalic acid and terephthalic acid.

According to a particular embodiment, the group $R_2$ is chosen from linear or branched $C_1$ to $C_{34}$ and preferably $C_1$ to $C_{18}$ acyclic alkyl groups, substituted with at least one hydroxyl group.

According to a particular embodiment, the group $R_2$ is represented by one of the formulae (V) and (VI) below:

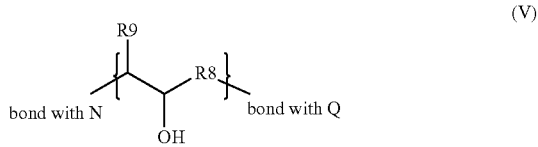

in which
$R_8$ is chosen from cyclic or acyclic, preferably acyclic, linear or branched $C_1$ to $C_{32}$ and preferably $C_1$ to $C_{16}$ hydrocarbon-based chains, preferably alkyl groups,
$R_9$ is chosen from hydrogen and $C_1$ to $C_6$, $C_1$ to $C_4$ alkyl groups, more preferentially hydrogen.

The copolymer may be prepared according to any known polymerization process. The various polymerization techniques and conditions are widely described in the literature and fall within the general knowledge of a person skilled in the art.

It is understood that it would not constitute a departure from the scope of the invention if the copolymer according to the invention were obtained from monomers other than ($m_a$) and ($m_b$), insofar as the final copolymer corresponds to that of the invention, i.e. obtained by copolymerization of at least ($m_a$) and ($m_b$). For example, it would not constitute a departure from the scope of the invention if the copolymer were obtained by copolymerization of monomers other than ($m_a$) and ($m_b$) followed by a post-functionalization.

For example, the blocks derived from a non-polar monomer ($m_a$) may be obtained from vinyl alcohol or acrylic acid, by transesterification or amidation reaction, respectively.

For example, the blocks derived from a polar monomer ($m_b$) may be obtained by post-functionalization of an intermediate polymer Pi resulting from the polymerization of an intermediate (meth)acrylate or (meth)acrylamide monomer ($m_i$) of formula (VII) defined above, and wherein said post-functionalization corresponds to the reaction of said intermediate polymer Pi with a tertiary amine $NR_3R_4R_5$ or $R_6N=R_7$, in which $R_3$, $R_4$, $R_5$, $R_6$ and $R_7$ are as defined above in formulae (III) and (IV).

The block copolymer may be obtained by sequenced polymerization, preferably by controlled sequenced polymerization, optionally followed by one or more post-functionalizations.

According to a particular embodiment, the block copolymer described above is obtained by controlled sequenced polymerization. The polymerization is advantageously chosen from controlled radical polymerization; for example atom transfer radical polymerization (ATRP); nitroxide-mediated radical polymerization (NMP: nitroxide-mediated polymerization); degenerative transfer processes such as degenerative iodine transfer polymerization (ITRP: iodine transfer radical polymerization) or reversible addition-fragmentation chain transfer radical polymerization (RAFT: reversible addition-fragmentation chain transfer); polymerizations derived from ATRP such as polymerizations using initiators for continuous activator regeneration (ICAR) or using activators regenerated by electron transfer (ARGET).

Mention will be made, by way of example, of the publication "Macromolecular Engineering by atom transfer radical polymerization", JACS, 136, 6513-6533 (2014), which describes a controlled sequenced polymerization process for forming block copolymers.

The controlled sequenced polymerization is typically performed in a solvent, under an inert atmosphere, at a reaction temperature generally ranging from 0 to 200° C., preferably from 50° C. to 130° C. The solvent may be chosen from polar solvents, in particular ethers such as anisole (methoxybenzene) or tetrahydrofuran, or apolar solvents, in particular paraffins, cycloparaffins, aromatics and alkylaromatics containing from 1 to 19 carbon atoms, for example benzene, toluene, cyclohexane, methylcyclohexane, n-butene, n-hexane, n-heptane and the like.

For atom transfer radical polymerization (ATRP), the reaction is generally performed under vacuum in the presence of an initiator, a ligand and a catalyst. As examples of ligands, mention may be made of N,N,N',N'',N''-pentamethyldiethylenetriamine (PMDETA), 1,1,4,7,10,10-hexamethyltriethylenetetramine (HMTETA), 2,2'-bipyridine (BPY) and tris(2-pyridylmethyl)amine (TPMA). Examples of catalysts that may be mentioned include: $CuX$, $CuX_2$, with $X=Cl$, Br and complexes based on ruthenium $Ru^{2+}/Ru^{3+}$.

The ATRP polymerization is preferably performed in a solvent chosen from polar solvents.

According to the controlled sequenced polymerization technique, it may also be envisaged to work under pressure.

The number of equivalents of non-polar monomer ($m_a$) of the block A and of polar monomer ($m_b$) of the block B reacted during the polymerization reaction are identical or different.

The number of equivalents of non-polar monomer ($m_a$) of the block A is preferably from 2 to 50, preferably from 5 to 50 and more preferentially from 10 to 50.

The number of equivalents of polar monomer ($m_b$) of the block B is preferably from 2 to 50, preferably from 2 to 40 and more preferentially from 2 to 20.

The number of equivalents of monomer ($m_a$) of the block A is advantageously greater than or equal to that of the monomer ($m_b$) of the block B.

In addition, the weight-average molar mass $M_w$ of the block A or of the block B is preferably less than or equal to 15 000 $g \cdot mol^{-1}$, more preferentially less than or equal to 10 000 $g \cdot mol^{-1}$.

The block copolymer advantageously comprises at least one sequence of blocks AB, ABA or BAB in which said blocks A and B form a sequence without the presence of an intermediate block of different chemical nature.

Other blocks may optionally be present in the block copolymer described previously insofar as these blocks do not fundamentally change the nature of the block copolymer. However, block copolymers containing only blocks A and B will be preferred.

Advantageously, A and B represent at least 70% by mass, preferably at least 90% by mass, more preferentially at least 95% by mass and even more preferentially at least 99% by mass of the block copolymer.

According to a particular embodiment, the block copolymer is a diblock copolymer.

According to another particular embodiment, the block copolymer is a triblock copolymer containing alternating blocks comprising two blocks A and one block B (ABA) or comprising two blocks B and one block A (BAB).

According to a particular embodiment, the block copolymer also comprises an end chain I consisting of a cyclic or acyclic, saturated or unsaturated, linear or branched $C_1$ to $C_{32}$, preferably $C_4$ to $C_{24}$ and more preferentially $C_{10}$ to $C_{24}$ hydrocarbon-based chain.

The term "cyclic hydrocarbon-based chain" means a hydrocarbon-based chain of which at least part is cyclic, especially aromatic. This definition does not exclude hydrocarbon-based chains comprising both an acyclic part and a cyclic part.

The end chain I may comprise an aromatic hydrocarbon-based chain, for example benzene-based, and/or a saturated and acyclic, linear or branched hydrocarbon-based chain, in particular an alkyl chain.

The end chain I is preferably chosen from alkyl chains, which are preferably linear, more preferentially alkyl chains of at least 4 carbon atoms and even more preferentially of at least 12 carbon atoms.

For the ATRP polymerization, the end chain I is located in the end position of the block copolymer. It may be introduced into the block copolymer by means of the polymerization initiator. Thus, the end chain I may advantageously constitute at least part of the polymerization initiator and is positioned within the polymerization initiator so as to make it possible to introduce, during the first step of polymerization initiation, the end chain I in the end position of the block copolymer.

The polymerization initiator is chosen, for example, from the free-radical initiators used in the ATRP polymerization process. These free-radical initiators well known to those skilled in the art are described especially in the article "Atom transfer radical polymerization: current status and future perspectives, Macromolecules, 45, 4015-4039, 2012".

The polymerization initiator is chosen, for example, from carboxylic acid alkyl esters substituted with a halide, preferably a bromine in the alpha position, for example ethyl 2-bromopropionate, ethyl α-bromoisobutyrate, benzyl chloride or bromide, ethyl α-bromophenylacetate and chloroethylbenzene. Thus, for example, ethyl 2-bromopropionate may make it possible to introduce into the copolymer the end chain I in the form of a $C_2$ alkyl chain and benzyl bromide in the form of a benzyl group.

For the RAFT polymerization, the transfer agent may conventionally be removed from the copolymer at the end of polymerization according to any known process.

According to one variant, the end chain I may also be obtained in the copolymer by RAFT polymerization according to the methods described in the article by Moad, G. and co., Australian Journal of Chemistry, 2012, 65, 985-1076. For example, the end chain I may be modified by aminolysis when a transfer agent is used to give a thiol function. Examples that may be mentioned include transfer agents of thiocarbonylthio, dithiocarbonate, xanthate, dithiocarbamate and trithiocarbonate type, for example S,S-bis(α,α'-dimethyl-α''-acetic acid) trithiocarbonate (BDMAT) or 2-cyano-2-propyl benzodithioate.

According to a particular embodiment, the block copolymer is a diblock copolymer. The block copolymer structure may be of the IAB or IBA type, advantageously IAB. The end chain I may be directly linked to block A or B according to the structure IAB or IBA, respectively, or may be connected via a bonding group, for example an ester, amide, amine or ether function. The bonding group then forms a bridge between the end chain I and block A or B.

According to a particular embodiment, the block copolymer may also be functionalized at the chain end according to any known process, especially by hydrolysis, aminolysis and/or nucleophilic substitution.

The term "aminolysis" means any chemical reaction in which a molecule is split into two parts by reaction of an ammonia molecule or an amine. A general example of aminolysis consists in replacing a halogen of an alkyl group by reaction with an amine, with removal of hydrogen halide. Aminolysis may be used, for example, for an ATRP polymerization which produces a copolymer bearing a halide in the end position or for a RAFT polymerization to convert the thio, dithio or trithio bond introduced into the copolymer by the RAFT transfer agent into a thiol function.

An end chain I' may thus be introduced by post-functionalization of the block copolymer obtained by controlled sequenced polymerization of the monomers $m_a$ and $m_b$ described above.

The end chain I' advantageously comprises a linear or branched, cyclic or acyclic $C_1$ to $C_{32}$, preferably $C_1$ to $C_{24}$ and more preferentially $C_1$ to $C_{10}$ hydrocarbon-based chain, even more preferentially an alkyl group, optionally substituted with one or more groups containing at least one heteroatom chosen from N and O, preferably N.

For an ATRP polymerization using a metal halide as catalyst, this functionalization may be performed, for example, by treating the copolymer IAB or IBA obtained by ATRP with a primary $C_1$ to $C_{32}$ alkylamine or a $C_1$ to $C_{32}$ alcohol under mild conditions so as not to modify the functions present on blocks A, B and I.

The quaternary ammonium group of block B described above may be acyclic or cyclic.

The acyclic quaternary ammonium group is advantageously chosen from trialkylammonium, iminium, amidinium, formamidinium, guanidinium and biguanidinium quaternary ammoniums, preferably trialkylammonium quaternary ammoniums.

The cyclic quaternary ammonium group is advantageously chosen from heterocyclic compounds containing at least one nitrogen atom chosen in particular from pyrrolinium, pyridinium, imidazolium, triazolium, triazinium, oxazolium and isoxazolium quaternary ammoniums.

The quaternary ammonium group of block B is advantageously a quaternary ammonium, advantageously a quaternary trialkylammonium.

According to a particular embodiment, block B is preferably derived from a monomer ($m_b$) obtained by the reaction:
- of a tertiary amine of formula $NR_3R_4R_5$ or $R_6N=R_7$ in which $R_3$, $R_4$, $R_5$, $R_6$ and $R_7$ are as described above, and
- of a (meth)acrylate or (meth)acrylamide intermediate monomer $m_t$ of formula (VII) below:

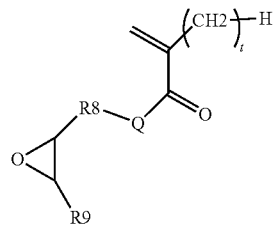

in which
Q, t, $R_8$ and $R_9$ are as described above.

According to another particular embodiment, block B is obtained by post-functionalization of an intermediate polymer Pi comprising at least one block P of formula (VIII) below:

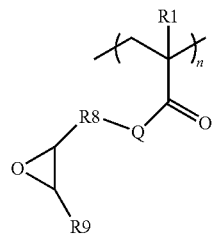

in which
Q, $R_8$ and $R_9$ are as described above, $R_1$ represents H or $CH_3$, n represents an integer ranging from 2 to 50, preferably from 2 to 40, more preferentially from 2 to 20.

The post-functionalization corresponds to the reaction of the intermediate polymer Pi with a tertiary amine of formula $NR_3R_4R_5$ or $R_6N=R_7$ in which $R_3$, $R_4$, $R_5$, $R_6$ and $R_7$ are as described previously.

The tertiary amine may be chosen, for example, from acyclic tertiary amines, preferably quaternizable trialkylamines, guanidines and imines. The tertiary amine is advantageously chosen from trialkylamines, in particular those in which the alkyl groups are identical or different and chosen independently from $C_1$ to $C_{18}$ and preferably $C_1$ to $C_{12}$ linear or branched, cyclic or acyclic, preferably acyclic, alkyls.

According to one variant, the tertiary amine may be chosen from cyclic tertiary amines, preferably quaternizable pyrrolines, pyridines, imidazoles, triazoles, guanidines, imines, triazines, oxazoles and isoxazoles.

The intermediate polymer Pi may also comprise at least one block A as described above.

The copolymer described above is particularly advantageous when it is used as detergent additive in a liquid fuel for an internal combustion engine.

The term "detergent additive for liquid fuel" means an additive which is incorporated in small amount into the liquid fuel and produces an effect on the cleanliness of said engine when compared with said liquid fuel not specially supplemented.

The liquid fuel is advantageously derived from one or more sources chosen from the group consisting of mineral, animal, plant and synthetic sources. Oil will preferably be chosen as mineral source.

The liquid fuel is preferably chosen from hydrocarbon-based fuels and fuels that are not essentially hydrocarbon-based, alone or as a mixture.

The term "hydrocarbon-based fuel" means a fuel constituted of one or more compounds constituted solely of carbon and hydrogen.

The term "fuel not essentially hydrocarbon-based" means a fuel constituted of one or more compounds not essentially constituted of carbon and hydrogen, i.e. which also contain other atoms, in particular oxygen atoms.

The hydrocarbon-based fuels especially comprise middle distillates with a boiling point ranging from 100 to 500° C. or lighter distillates with a boiling point in the gasoline range. These distillates may be chosen, for example, from the distillates obtained by direct distillation of crude hydrocarbons, vacuum distillates, hydrotreated distillates, distillates derived from the catalytic cracking and/or hydrocracking of vacuum distillates, distillates resulting from conversion processes such as ARDS (atmospheric residue desulfurization) and/or viscoreduction, and distillates derived from the upgrading of Fischer-Tropsch fractions. The hydrocarbon-based fuels are typically gasolines and gas oils (also known as diesel fuel).

Gasolines in particular comprise any commercially available fuel compositions for spark ignition engines. A representative example that may be mentioned is the gasolines corresponding to standard NF EN 228. Gasolines generally have octane numbers that are high enough to avoid pinking. Typically, the fuels of gasoline type sold in Europe, in accordance with standard NF EN 228, have a motor octane number (MON) of greater than 85 and a research octane number (RON) of at least 95. Fuels of gasoline type generally have an RON ranging from 90 to 100 and an MON ranging from 80 to 90, the RON and MON being measured according to standard ASTM D 2699-86 or D 2700-86.

Gas oils (diesel fuels) in particular comprise all commercially available fuel compositions for diesel engines. A representative example that may be mentioned is the gas oils corresponding to standard NF EN 590.

Fuels that are not essentially hydrocarbon-based especially comprise oxygen-based compounds, for example distillates resulting from the BTL (biomass to liquid) conversion of plant and/or animal biomass, taken alone or in combination; biofuels, for example plant and/or animal oils and/or ester oils; biodiesels of animal and/or plant origin and bioethanols.

The mixtures of hydrocarbon-based fuel and of fuel that is not essentially hydrocarbon-based are typically gas oils of $B_x$ type or gasolines of $E_x$ type.

The term "gas oil of $B_x$ type for diesel engines" means a gas oil fuel which contains x % (v/v) of plant or animal oil esters (including spent cooking oils) transformed via a chemical process known as transesterification, obtained by reacting this oil with an alcohol so as to obtain fatty acid esters (FAE). With methanol and ethanol, fatty acid methyl esters (FAME) and fatty acid ethyl esters (FAEE) are obtained, respectively. The letter "B" followed by a number indicates the percentage of FAE contained in the gas oil. Thus, a B99 contains 99% of FAE and 1% of middle distillates of fossil origin (mineral source), B20 contains 20% of FAE and 80% of middle distillates of fossil origin, etc. Gas oils of $B_0$ type which do not contain any oxygen-based compounds are thus distinguished from gas oils of Bx type which contain x % (v/v) of plant oil esters or of fatty acid esters, usually the methyl esters (POME or FAME). When the FAE is used alone in engines, the fuel is designated by the term B100.

The term "gasoline of $E_x$ type for spark ignition engines" means a gasoline fuel which contains x % (v/v) of oxygen-based compounds, generally ethanol, bioethanol and/or tert-butyl ethyl ether (TBEE).

The sulfur content of the liquid fuel is preferably less than or equal to 5000 ppm, preferably less than or equal to 500 ppm and more preferentially less than or equal to 50 ppm, or even less than 10 ppm and advantageously sulfur-free.

The copolymer described above is used as detergent additive in the liquid fuel in a content advantageously of at least 10 ppm, preferably at least 50 ppm, more preferentially in a content from 10 to 5000 ppm, even more preferentially from 10 to 1000 ppm.

According to a particular embodiment, the use of a copolymer as described previously in the liquid fuel makes it possible to maintain the cleanliness of at least one of the internal parts of the internal combustion engine and/or to clean at least one of the internal parts of the internal combustion engine.

The use of the copolymer in the liquid fuel makes it possible in particular to limit or prevent the formation of deposits in at least one of the internal parts of said engine ("keep-clean" effect) and/or to reduce the existing deposits in at least one of the internal parts of said engine ("clean-up" effect).

Thus, the use of the copolymer in the liquid fuel makes it possible, when compared with liquid fuel that is not specially supplemented, to limit or prevent the formation of deposits in at least one of the internal parts of said engine or to reduce the existing deposits in at least one of the internal parts of said engine.

Advantageously, the use of the copolymer in the liquid fuel makes it possible to observe both effects simultaneously, limitation (or prevention) and reduction of deposits ("keep-clean" and "clean-up" effects).

The deposits are distinguished as a function of the type of internal combustion engine and of the location of the deposits in the internal parts of said engine.

According to a particular embodiment, the internal combustion engine is a spark ignition engine, preferably with direct injection (DISI: direct-injection spark ignition engine). The deposits targeted are located in at least one of the internal parts of said spark ignition engine. The internal part of the spark ignition engine that is kept clean (keep-clean) and/or cleaned (clean-up) is advantageously chosen from the engine intake system, in particular the intake valves (IVD: intake valve deposit), the combustion chamber (CCD: combustion chamber deposit, or TCD: total chamber deposit) and the fuel injection system, in particular the injectors of an indirect injection system (PFI: port fuel injector) or the injectors of a direct injection system (DISI).

According to another particular embodiment, the internal combustion engine is a diesel engine, preferably a direct-injection diesel engine, in particular a diesel engine with a common-rail injection system (CRDI: common-rail direct injection). The deposits targeted are located in at least one of the internal parts of said diesel engine.

Advantageously, the deposits targeted are located in the injection system of the diesel engine, preferably located on an external part of an injector of said injection system, for example the injector tip, and/or on an internal part of an injector of said injection system (IDID: internal diesel injector deposits), for example on the surface of an injector needle.

The deposits may be constituted of coking-related deposits and/or deposits of soap and/or lacquering type.

The copolymer as described previously may advantageously be used in the liquid fuel to reduce and/or prevent power loss due to the formation of the deposits in the internal parts of a direct-injection diesel engine, said power loss being determined according to the standardized engine test method CEC F-98-08.

The copolymer as described previously may advantageously be used in the liquid fuel to reduce and/or prevent restriction of the fuel flow emitted by the injector of a direct-injection diesel engine during its functioning, said flow restriction being determined according to the standardized engine test method CEC F-23-1-01.

Advantageously, the use of the copolymer as described above makes it possible, when compared with liquid fuel that is not specially supplemented, to limit or prevent the formation of deposits on at least one type of deposit described previously and/or to reduce the existing deposits on at least one type of deposit described previously.

According to a particular embodiment, the use of the copolymer described above also makes it possible to reduce the fuel consumption of the internal combustion engine.

According to another particular embodiment, the use of the copolymer described above also makes it possible to reduce the pollutant emissions, in particular the particle emissions of the internal combustion engine.

Advantageously, the use of the copolymer according to the invention makes it possible to reduce both the fuel consumption and the pollutant emissions.

The copolymer described above may be used alone, in the form of a mixture of at least two of said copolymers or in the form of a concentrate.

The copolymer may be added to the liquid fuel in a refinery and/or may be incorporated downstream of the refinery and/or optionally as a mixture with other additives in the form of an additive concentrate, also known by the common name "additive package".

The copolymer described above is used as a mixture with an organic liquid in the form of a concentrate.

According to a particular embodiment, a concentrate for fuel comprises one or more copolymers as described above, as a mixture with an organic liquid.

The organic liquid is inert with respect to the block copolymer described above and miscible in the liquid fuel described previously. The term "miscible" describes the fact that the copolymer and the organic liquid form a solution or a dispersion so as to facilitate the mixing of the copolymer in the liquid fuels according to the standard fuel supplementation processes.

The organic liquid is advantageously chosen from aromatic hydrocarbon-based solvents such as the solvent sold under the name Solvesso, alcohols, ethers and other oxygen-based compounds and paraffinic solvents such as hexane, pentane or isoparaffins, alone or as a mixture.

The concentrate may advantageously comprise from 5% to 99% by mass, preferably from 10% to 80% and more preferentially from 25% to 70% of copolymer as described previously.

The concentrate may typically comprise from 1% to 95% by mass, preferably from 10% to 70% and more preferentially from 25% to 60% of organic liquid, the remainder corresponding to the copolymer, it being understood that the concentrate may comprise one or more block copolymers as described above.

In general, the solubility of the block copolymer in the organic liquids and the liquid fuels described previously will depend especially on the weight-average and number-average molar masses $M_w$ and $M_n$, respectively, of the copolymer. The average molar masses $M_w$ and $M_n$ of the copolymer according to the invention will be chosen so that the copolymer is soluble in the liquid fuel and/or the organic liquid of the concentrate for which it is intended.

The average molar masses $M_w$ and $M_n$ of the copolymer according to the invention may also have an influence on the efficiency of this copolymer as a detergent additive. The average molar masses $M_w$ and $M_n$ will thus be chosen so as to optimize the effect of the copolymer according to the invention, especially the detergency effect (engine cleanliness) in the liquid fuels described above.

The average molar masses $M_w$ and $M_n$ may be optimized via routine tests accessible to those skilled in the art.

According to a particular embodiment, the copolymer advantageously has a weight-average molar mass ($M_w$) ranging from 500 to 30 000 g·mol$^{-1}$, preferably from 1000 to 10 000 g·mol$^{-1}$, more preferentially less than or equal to 4000 g·mol$^{-1}$, and/or a number-average molar mass ($M_e$) ranging from 500 to 15 000 g·mol$^{-1}$, preferably from 1000 to 10 000 g·mol$^{-1}$, more preferentially less than or equal to 4000 g·mol$^{-1}$. The number-average and weight-average molar masses are measured by size exclusion chromatography (SEC). The operating conditions of SEC, especially the choice of the solvent, will be chosen as a function of the chemical functions present in the block copolymer.

According to a particular embodiment, the copolymer according to the invention is used in the form of an additive concentrate in combination with at least one other fuel additive for an internal combustion engine other than the copolymer described previously.

The additive concentrate may typically comprise one or more other additives chosen from detergent additives other than the copolymer described above, for example from anticorrosion agents, dispersants, demulsifiers, antifoams, biocides, reodorants, proketane additives, friction modifiers, lubricant additives or oiliness additives, combustion promoters (catalytic combustion and soot promoters), agents for improving the cloud point, the flow point or the FLT (filterability limit temperature), anti-sedimentation agents, anti-wear agents and conductivity modifiers.

Among these additives, mention may be made in particular of:

a) proketane additives, especially (but not limitingly) chosen from alkyl nitrates, preferably 2-ethylhexyl nitrate, aryl peroxides, preferably benzyl peroxide, and alkyl peroxides, preferably tert-butyl peroxide;

b) antifoam additives, especially (but not limitingly) chosen from polysiloxanes, oxyalkylated polysiloxanes and fatty acid amides derived from plant or animal oils. Examples of such additives are given in EP861882, EP663000 and EP736590;

c) cold flow improvers (CFI) chosen from copolymers of ethylene and of an unsaturated ester, such as ethylene/vinyl acetate (EVA), ethylene/vinyl propionate (EVP), ethylene/vinyl ethanoate (EVE), ethylene/methyl methacrylate (EMMA) and ethylene/alkyl fumarate copolymers described, for example, in U.S. Pat. Nos. 3,048,479, 3,627,838, 3,790,359, 3,961,961 and EP261957;

d) lubricant additives or anti-wear agents, especially (but not limitingly) chosen from the group constituted by fatty acids and ester or amide derivatives thereof, especially glyceryl monooleate, and monocyclic and polycyclic carboxylic acid derivatives. Examples of such additives are given in the following documents: EP680506, EP860494, WO98/04656, EP915944, FR2772783, FR2772784;

e) cloud point additives, especially (but not limitingly) chosen from the group constituted by long-chain olefin/

(meth)acrylic ester/maleimide terpolymers, and fumaric/maleic acid ester polymers. Examples of such additives are given in FR2528051, FR2528051, FR2528423, EP112195, EP172758, EP271385 and EP291367;

f) detergent additives, especially (but not limitingly) chosen from the group constituted by succinimides, polyetheramines and quaternary ammonium salts; for example those described in U.S. Pat. No. 4,171,959 and WO2006135881;

g) cold workability polyfunctional additives chosen from the group constituted by polymers based on olefin and alkenyl nitrate as described in EP573490.

These other additives are generally added in an amount ranging from 10 to 1000 ppm (each), preferably from 100 to 1000 ppm.

According to a particular embodiment, one or more copolymers as described previously are used in combination with at least one compound chosen from succinimides in the additive concentrate or in the liquid fuel as described above.

It is understood that for an additive concentrate comprising an organic liquid, the latter is inert with respect to said succinimide compound.

Advantageously, the succinimides are substituted with a hydrocarbon-based chain, preferably a $C_8$-$C_{500}$, more preferentially $C_{12}$-$C_{150}$, hydrocarbon-based chain.

Advantageously, the copolymer is used in combination with at least one compound chosen from polyisobutene succinimides.

Polyisobutene succinimides are compounds obtained by reaction of a succinic acid or anhydride, substituted with a polyisobutenyl chain, with an amine.

Preferably, the polyisobutenyl chain substituting the succinic acid or anhydride has a number-average molecular weight ranging from 500 to 5000 g/mol, preferably from 800 to 1300 g/mol, the number-average molecular weight being determined by gel permeation chromatography (GPC), also referred to as size exclusion chromatography (SEC), from the starting polymer.

The preparation of succinic anhydrides substituted with a polyisobutenyl chain is widely described in the literature. For example, documents U.S. Pat. Nos. 3,361,673 and 3,018,250 describe the preparation thereof by high-temperature reaction between a polyisobutene and maleic anhydride, or else by reaction between a halogenated, especially chlorinated, polyisobutene and maleic anhydride. Mention may also be made of document GB 949,981 which describes the preparation of such compounds from a mixture of polyisobutenyl and succinic anhydride and in which chlorine is injected.

In any case, the product obtained consists of a complex mixture of unreacted polymers and succinic anhydrides substituted with a polyisobutene chain in which the polyisobutenyl substituent is bonded to at least one of the carbons located in the alpha position of the carbonyl groups of the succinic anhydride.

Preferentially, the amine used for preparing the polyisobutene succinimide corresponds to the following formula (IX):

$$H_2N-(R_{10}NH)_p-H \quad (IX)$$

in which:
the groups $R_{10}$ are chosen independently from $C_1$-$C_5$, preferably $C_2$-$C_3$, alkylene chains, and
p is an integer ranging from 0 to 10, preferably from 3 to 5.

According to a first variant, the amine used for preparing the polyisobutene succinimide is ammonia $NH_3$.

According to another preferred variant, the amine used for preparing the polyisobutene succinimide is chosen from polyalkylene polyamines. According to this variant, the amine corresponds to the formula (IX) with p being strictly greater than 0.

According to a preferred embodiment, the groups $R_{10}$ are all identical.

Even more preferentially, the polyalkylene polyamine is chosen from polyethylene polyamines of the following formula (X):

$$H_2N-(CH_2CH_2NH)_p-H \quad (X)$$

in which p is an integer ranging from 1 to 10, preferably from 3 to 5.

Advantageously, the polyethylene polyamine is chosen from ethylenediamine, triethylenetetramine, tetraethylenepentamine and pentaethylenehexamine. More advantageously, the polyethylene polyamine is tetraethylenepentamine.

Preferably, the succinic acid or succinic anhydride, substituted with a polyisobutene chain, and the amine are introduced in a molar ratio ranging from 0.2:1 to 5:1, preferably ranging from 0.2:1 to 2.5:1, even more preferably ranging from 1:1 to 2:1

The reaction between the succinic acid or anhydride substituted with a polyisobutenyl chain and the amine is preferably carried out at a temperature of at least 80° C., preferably at a temperature ranging from 125 to 250° C.

Preferably, the polyisobutene succinimide corresponds to the following formula (XI):

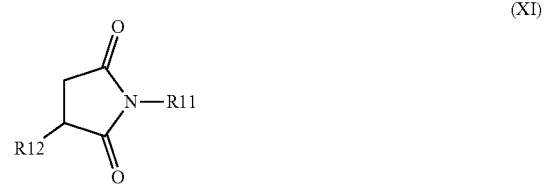

(XI)

in which:
R12 is a polyisobutenyl chain, and
R11 is a polyalkylene polyamine chain of the following formula (XII):

$$(R_{10}NH)_p-H \quad (XII)$$

in which:
the groups $R_{10}$ are chosen independently from $C_1$-$C_5$, preferably $C_2$-$C_3$, alkylene chains, and
p is an integer ranging from 1 to 10, preferably from 3 to 5.

It is important to note that polyalkylene polyamines are commercially available in the form of complex mixtures also comprising, in small amounts, cyclic compounds such as piperazines. Consequently, the detergent additives of polyisobutene succinimide type described previously are available in the form of mixtures that may also comprise, in a minor amount, unreacted polyolefins, reaction solvent or else by-products. It is common in the literature to refer to these mixtures using the expression "alkenyl succinimide detergent".

Preferentially, when the polyisobutene succinimide is present in the additive concentrate, it is present in an amount ranging from 1 to 1000 ppm, preferably ranging from 5 to 500 ppm, more preferentially ranging from 10 to 200 ppm, even more preferentially ranging from 20 to 100 ppm.

Advantageously, the mass ratio of the copolymer(s) to the succinimide compound ranges from 5: 95 to 95: 5, preferably 10: 90 to 90: 10.

The use of one or more copolymers according to the invention in a mixture with at least one succinimide compound described above or in the form of the concentrate described above in the liquid fuel makes it possible to maintain the cleanliness of at least one of the internal parts of the internal combustion engine and/or to clean at least one of the internal parts of the internal combustion engine and also makes it possible to improve the separation of water and fuel when the latter contains water. "Improve the separation of water and fuel" means accelerating the separation, and/or increasing the degree of separation, of the fuel and the residual water present in this fuel, compared to a fuel devoid of:

said succinimide compound and/or
said mixture and/or
said concentrate.

The mole ratio and/or mass ratio between the polar monomer ($m_b$) and the non-polar monomer ($m_a$) and/or between block A and B in the block copolymer described above will be chosen so that the block copolymer is soluble in the fuel and/or the organic liquid of the concentrate for which it is intended. Similarly, this ratio may be optimized as a function of the fuel and/or of the organic liquid so as to obtain the best effect on the engine cleanliness.

Optimizing the mole ratio and/or mass ratio may be performed via routine tests accessible to those skilled in the art.

According to a particular embodiment, the mole ratio between the non-polar monomer ($m_a$) and the polar monomer ($m_b$), or between blocks A and B as a molar percentage between the non-polar monomer ($m_a$) of block A and the polar monomer ($m_b$) of block B, is preferably between 95:5 and 70:30, more preferentially from 85:15 to 75:25.

According to a particular embodiment, a fuel composition is prepared according to any known process by supplementing the liquid fuel described previously with at least one copolymer as described above.

According to a particular embodiment, a fuel composition comprising:
(1) a fuel as described above, and
(2) one or more copolymers as described previously.

The fuel (1) is chosen in particular from hydrocarbon-based fuels and fuels that are not essentially hydrocarbon-based described previously, alone or as a mixture.

The combustion of this fuel composition comprising such a copolymer in an internal combustion engine produces an effect on the cleanliness of the engine when compared with the liquid fuel not specially supplemented and makes it possible in particular to prevent or reduce the fouling of the internal parts of said engine. The effect on the cleanliness of the engine is as described previously in the context of using the copolymer.

According to a particular embodiment, the combustion of the fuel composition comprising such a copolymer in an internal combustion engine also makes it possible to reduce the fuel consumption and/or the pollutant emissions.

The copolymer according to the invention is preferably incorporated in a small amount into the liquid fuel described previously, the amount of copolymer being sufficient to produce a detergent effect as described above and thus to improve the engine cleanliness.

The fuel composition advantageously comprises at least 5 ppm, preferably from 10 to 5000 ppm, more preferentially from 20 to 2000 ppm and in particular from 50 to 500 ppm of copolymer(s) (2).

Besides the copolymer described above, the fuel composition may also comprise one or more other additives other than the copolymer according to the invention, chosen from the other known detergent additives, for example from anticorrosion agents, dispersants, demulsifiers, antifoams, biocides, reodorants, proketane additives, friction modifiers, lubricant additives or oiliness additives, combustion promoters (catalytic combustion and soot promoters), agents for improving the cloud point, the flow point or the FLT, anti-sedimentation agents, anti-wear agents and/or conductivity modifiers.

The various additives of the copolymer according to the invention are, for example, the fuel additives listed above.

According to a particular embodiment, a process for maintaining the cleanliness (keep-clean) and/or for cleaning (clean-up) at least one of the internal parts of an internal combustion engine comprises the preparation of a fuel composition by supplementation of a fuel with one or more copolymers as described above and combustion of said fuel composition in the internal combustion engine.

According to a particular embodiment, the internal combustion engine is a spark ignition engine, preferably with direct injection (DISI).

The internal part of the spark ignition engine that is kept clean and/or cleaned is preferably chosen from the engine intake system, in particular the intake valves (IVD), the combustion chamber (CCD or TCD) and the fuel injection system, in particular the injectors of an indirect injection system (PFI) or the injectors of a direct injection system (DISI).

According to another particular embodiment, the internal combustion engine is a diesel engine, preferably a direct-injection diesel engine, in particular a diesel engine with common-rail injection systems (CRDI).

The internal part of the diesel engine that is kept clean (keep-clean) and/or cleaned (clean-up) is preferably the injection system of the diesel engine, preferably an external part of an injector of said injection system, for example the injector tip, and/or one of the internal parts of an injector of said injection system, for example the surface of an injector needle.

The process for maintaining the cleanliness (keep-clean) and/or for cleaning (clean-up) comprises the successive steps of:

a) determination of the most suitable supplementation for the fuel, said supplementation corresponding to the selection of the copolymer(s) described above to be incorporated in combination, optionally, with other fuel additives as described previously and the determination of the degree of treatment necessary to achieve a given specification relative to the detergency of the fuel composition.

b) incorporation into the fuel of the selected copolymer(s) in the amount determined in step a) and, optionally, of the other fuel additives.

The copolymer(s) may be incorporated into the fuel, alone or as a mixture, successively or simultaneously.

Alternatively, the copolymer(s) may be used in the form of a concentrate or of an additive concentrate as described above.

Step a) is performed according to any known process and falls within the common practice in the field of fuel supplementation. This step involves defining at least one representative characteristic of the detergency properties of the fuel composition.

The representative characteristic of the detergency properties of the fuel will depend on the type of internal combustion engine, for example a diesel or spark ignition engine, the direct or indirect injection system and the location in the engine of the deposits targeted for cleaning and/or maintaining the cleanliness.

For direct-injection diesel engines, the representative characteristic of the detergency properties of the fuel may correspond, for example, to the power loss due to the formation of deposits in the injectors or restriction of the fuel flow emitted by the injector during the functioning of said engine.

The representative characteristic of the detergency properties may also correspond to the appearance of lacquering-type deposits on the injector needle (IDID).

Methods for evaluating the detergency properties of fuels have been widely described in the literature and fall within the general knowledge of a person skilled in the art. Non-limiting examples that will be mentioned include the tests standardized or acknowledged by the profession or the following methods described in the literature:

For direct-injection diesel engines:
  the method DW10, standardized engine test method CEC F-98-08, for measuring the power loss of direct-injection diesel engines
  the method XUD9, standardized engine test method CEC F-23-1-01 Issue 5, for measuring the restriction of fuel flow emitted by the injector
  the method described by the Applicant in patent application WO 2014/029770, pages 17 to 20, for the evaluation of lacquering deposits (IDID), this method being cited by way of example and/or incorporated by reference into the present patent application.

For indirect-injection spark ignition engines:
  the Mercedes Benz M102E method, standardized test method CEC F-05-A-93, and
  the Mercedes Benz M111 method, standardized test method CEC F-20-A-98. These methods make it possible to measure the intake valve deposits (IVD), the tests generally being performed on a Eurosuper gasoline corresponding to standard EN228.

For direct-injection spark ignition engines:
  the method described by the Applicant in the article "Evaluating Injector Fouling in Direct Injection Spark Ignition Engines", Mathieu Arondel, Philippe China, Julien Gueit; Conventional and future energy for automobiles; 10th international colloquium; Jan. 20-22, 2015, pages 375-386 (Technische Akademie Esslingen par Techn. Akad. Esslingen, Ostfildern), for the evaluation of the coking deposits on the injector, this method being cited by way of example and/or incorporated by reference into the present patent application.
  the method described in US20130104826 for the evaluation of the coking deposits on the injector, this method being cited by way of example and/or incorporated by reference into the present patent application.

The amount of copolymer to be added to the fuel composition to achieve the specification will typically be determined by comparison with the fuel composition not containing the block copolymer according to the invention.

The amount of copolymer to be added to the fuel composition to achieve the specification (step a) described previously) will typically be determined by comparison with the fuel composition not containing the copolymer according to the invention, the specification given relative to the detergency possibly being, for example, a target power loss value according to the method DW10 or a flow restriction value according to the method XUD9 mentioned above.

The amount of copolymer may also vary as a function of the nature and origin of the fuel, in particular as a function of the content of compounds bearing n-alkyl, isoalkyl or n-alkenyl substituents. Thus, the nature and origin of the fuel may also be a factor to be taken into consideration for step a).

The process for maintaining the cleanliness (keep-clean) and/or for cleaning (clean-up) may also comprise an additional step after step b) of checking the target reached and/or of adjusting the amount of supplementation with the copolymer(s) as detergent additive.

The copolymers according to the invention have noteworthy properties as detergent additive in a liquid fuel, in particular in a gas oil or gasoline fuel.

The copolymers according to the invention are particularly noteworthy especially since they are efficient as detergent additive for a wide range of liquid fuels and/or for one or more types of engine specification and/or against one or more types of deposit which become formed in the internal parts of internal combustion engines.

Example: Syntheses of a $DMAEA_{quat}$/VEOVA Copolymer by Reversible Addition-Fragmentation Chain-Transfer (RAFT) Radical Polymerization Reaction Products:
  Polymerization initiator: α,α'-azoisobutyronitrile, AIBN, (CAS 78-67-1)
  RAFT transfer agent of xanthate type: 2-mercaptopropionic acid methyl ester O-ethyl dithiocarbonate, Xanthate
  To obtain block A—monomer $m_a$:
  Neodecanoic acid vinyl ester, VEOVA (CAS 51000-52-3)
  To obtain block B—monomers $m_b$:
  dimethylaminoethyl acrylate, DMAEA (CAS 2439-35-2)
  Quaternizing agent: 99% 1,2-epoxybutane (CAS 106-88-7)

Synthesis of the RAFT Agent of Xanthate Type

2-Methyl bromopropionate (26.75 g, 160 mmol, 1 eq) and 158 ml of ethanol are introduced into a single-necked round-bottomed flask (500 ml). The round-bottomed flask is then placed in an ice bath with stirring. Potassium ethyl xanthate (28.24 g, 176 mmol, 1.1 eq) is added gradually over 45 min; a yellow reaction medium with some suspended particles is obtained. Once the addition is ended, the medium is left to react for 3 h at room temperature. The potassium bromide precipitates (insoluble in ethanol). When the reaction is finished, the medium is filtered over a Büchner funnel and concentrated under reduced pressure using a rotary evaporator until a dry product is obtained. 300 ml of dichloromethane are then added to the filtrate then placed in a separating funnel in which the organic phase is extracted and washed with distilled water (4×50 ml). The organic phase is finally dried with magnesium sulfate $MgSO_4$ in an Erlenmeyer flask. After filtration, the dichloromethane is evaporated as previously. Finally, the latter is placed in a vacuum bell jar in order to eliminate all traces of solvent. Obtaining the product: yellowish liquid (yield: 94.6%). $^1$H NMR ($CDCl_3$): 1.40 ($CH_2$—$CH_3$, 3H, t), 1.56 (CH—$CH_3$, 3H, d), 3.74 ($CH_3$—O, 3H, s), 4.38 (CH—$CH_3$, 1H, q) 4.62 ($CH_2$—$CH_3$, 2H, q).

Synthesis of the Block Copolymer 4.34 g (30.3 mmol) of DMAEA and 776 mg (3.49 mmol) of xanthate are dissolved in 2.2 ml of dioxane, then the latter is sparged with nitrogen for 30 min. In another round-bottomed flask, 50.8 mg (0.30 mmol) of AIBN are dissolved in 2 ml of dioxane then sparged with nitrogen for 30 min. The reaction medium is heated to 80° C. and the AIBN solution is then added under nitrogen. The reaction medium is stirred under nitrogen for 6 h at 80° C. Approximately 30 min before the end of the reaction, 16.05 g of VEOVA (81.3 mmol) are placed in a round-bottomed flask with 15.5 ml of dioxane and sparged with nitrogen as previously. 100 mg (0.60 mmol) of AIBN are also dissolved in 3 ml of dioxane then sparged with nitrogen for 30 min. The VEOVA and AIBN solutions are successively introduced into the reaction medium under nitrogen. The medium is stirred for approximately 20 h at 80° C. During the copolymerization, and after four hours of stirring, 54.3 mg of AIBN are added to the reaction mixture. After returning to room temperature and atmospheric air, the tertiary amine functions contained in the copolymer are quaternized according to the following protocol.

Quaternization:

8.8 g of epoxybutane (122 mmol), 7.33 g of acetic acid (122 mmol) and 66 ml of butanol are successively added to the round-bottomed flask containing the reaction mixture, over which a Vigreux column is placed. The medium is stirred for 24 h at 60° C.

After returning to room temperature, the solvent is evaporated to dryness.

The operating conditions and the characteristics of the copolymer obtained are collated in table 1 below:

TABLE 1

| | Starting monomers | Conversion (%)[1] | % of residual monomers[2] | Mole ratio[3] | $M_n$[4] | $I_p$[4] | Number of units[5] A | B |
|---|---|---|---|---|---|---|---|---|
| DMAEA$_{quat}$/VEOVA copolymer | DMAEA | 96 | <0.1 | 60/40 | 8200 | 1.68 | 18 | 14 |
| | VEOVA | 40 | 24.2 | | | | | |

(1) Conversion: percentage of monomer converted to polymer, calculated from UHPLC analysis by comparison of a chromatogram produced in the final state with a chromatogram produced in the initial state, before the step of polymerization of each block.
System: Thermo Fisher (Ultra-high performance liquid chromatography (UHPLC)
UHPLC Ultimate 3000)
Stationary phase: Symmetry Shield RP 18 column
Mobile phase: A (water/MeOH+CH$_2$O$_2$ at pH 5) B (MEOH+CH$_2$O$_2$ at pH 5)
Oven temperature: 40° C.
Flow rate: 1 ml/min
Vinj: 5 µl
Elution gradient over 23 min
Detector: DAD
(2) Content of residual monomers in the diblock copolymer before quaternization and before drying, calculated from the analysis of $^1$H NMR measurements taken with a Bruker 600 MHz spectrometer ($^1$H Larmor frequency) operating under TopSpin 2.1. The measuring probe used is an X{1H}{19F} BBFO double-resonance probe with z pulsed magnetic field gradient and 2H lock (probe specifications: $^{13}$C signal-to-noise (S/N) ratio: ASTM=312:1; 10% EB=278:1). The analysis is performed at 300 K, the polymer concentrations are variable in 0.6 ml of CDCl$_3$, in the presence of a known mass of 1,2,4,5-tetrachloro-3-nitrobenzene*(TCNB) used as internal standard for the absolute quantification of the residual monomer species. The $^1$H and $^{13}$C chemical shifts were calibrated with the $^1$H and $^{13}$C signals of CDCl$_3$: δ$^1$H 7.26 ppm and δ$^{13}$C 77.16 ppm.
For the residual content of DMAEA, the ethylene signals characteristic of DMAEA, observed at 6.36, 6.10 and 5.77 ppm, are used.
For the residual content of VEOVA, the ethylene signals characteristic of VEOVA, observed at 7.25, 4.85 and 4.53 ppm, are used.
(3) Mole ratio calculated before quaternization by $^1$H NMR, by fixing at 2 the integral of the unresolved peak at 2.7-2.5 ppm, combined with the groups —NCH$_2$ (2H) of the DMAEA units, integrals of 2.0 and 6.0 are obtained for the unresolved peaks at 4.3-3.9 ppm and 2.5-2.2 ppm respectively associated with the groups —OCH$_2$ (2H) and —N(CH$_3$)$_2$ (6H) of the DMAEA units. With this reference, an integral (corrected to take into account the presence of residual monomers) of 1.3 is measured for the unresolved peak at 5.1-4.4 ppm associated with the groups —CH$_2$CHO— (1H) of the n−1 VEOVA units.
(4) Mn, Mw and the polydispersity index (Ip) determined by SEC, with a Waters Styragel machine operating at 40° C. and 645 psi with a flow rate of THF of 1 ml/minute, equipped with an RI detector. The solvent used is THF stabilized with BHT (1 g/l) and the flow rate is set at 1 mL·min$^{-1}$. The number-average molar masses (Mn) were determined by RI (refractive index) detection from calibration curves constructed for polymethyl methacrylate (PMMA) standards.
(5) The values n and p are determined by $^1$H NMR. In $^1$H NMR, a signal is detected at around 3.6 ppm which is associated with the group —COOCH$_3$ (3H) of the xanthate RAFT agent. By fixing the integral thereof at 3, an integral (corrected to take into account the presence of residual monomers and the group —OCH$_2$ of the RAFT agent) of 18 is obtained for the unresolved peak at 5.1-4.4 ppm associated with the groups —CH$_2$CHO— (1H) of the VEOVA units. This number corresponds to the total number of VEOVA units give or take one unit (n−1) since the final VEOVA unit contains a CH$_2$CH(O)S group, the chemical shift of which is more expected at around 6.6 ppm (signal not detected). In addition, still with the same reference, a mean integral of 14 is measured for the signals characteristic of the DMAEA units.

XUD9 Engine Test—Determination of the Loss of Flow Rate

The XUD9 test makes it possible to determine the restriction of the flow of a gas oil emitted by the injector of a prechamber diesel engine during its functioning, according to the standardized engine test method CEC F-23-1-01.

The object of this XUD9 test is to evaluate the ability of the gas oil and/or of the additive and/or of the additive composition tested to maintain the cleanliness, "keep-clean"

effect, of the injectors of a four-cylinder Peugeot XUD9 A/L injection and prechamber diesel engine, in particular to evaluate its ability to limit the formation of deposits on the injectors.

The test was performed on a virgin gas oil with the reference RF96 (GOM B0) corresponding to standard EN590, said supplemented gas oil GOM B0, denoted $GOM_1$, containing a level of additive treatment of 100 ppm by weight of the $DMAEA_{quat}$/VEOVA copolymer synthesized in the previous example.

The test is started with a four-cylinder Peugeot XUD9 A/L injection and prechamber diesel engine equipped with clean injectors, the flow rate of which was determined beforehand. The engine follows a determined test cycle for 10 hours and 3 minutes (repetition of the same cycle 134 times). At the end of the test, the flow rate of the injectors is again evaluated. The amount of fuel required for the test is 60 liters. The loss of flow rate is measured on the four injectors. The results are expressed as a percentage loss of flow rate for various needle lifts. Usually, the fouling values are compared at a needle lift of 0.1 mm since they are more discriminating and more precise and repeatable (repeatability <5%). The change in loss of flow rate before/after test makes it possible to deduce the percentage loss of flow rate. Taking into account the repeatability of the test, a significant detergent effect can be asserted for a reduction in the loss of flow rate, i.e. a gain in flow rate of greater than 10 points (>10%) relative to a virgin fuel.

The results are collated in table 2 below:

TABLE 2

| Ref. | Detergency additive | Loss of flow rate* (%) | Gain in flow rate* (%) |
|---|---|---|---|
| GOM B0 | — | 65.8 | 0 |
| GOM1 | $DMAEA_{quat}$/VEOVA block copolymer | 41.4 | 24.4 |

*mean for the four injectors

It is observed that the fuel GOM1 has a noteworthy effect on limiting the fouling of XUD9 injectors when compared with the non-supplemented fuel GOM B0.

The gas oil composition supplemented with the copolymer according to the present invention GOM1 shows a loss of flow rate less than that of the tested reference GOM B0. Supplementation of GOM B0 with the copolymer according to the invention makes it possible to obtain a mean loss of flow rate of less than 50% and a mean gain in flow rate of greater than 20%, even with a very low degree of supplementation of 100 ppm m/m.

Demulsification Test

The demulsification properties of additives for fuel or of additive concentrate for fuel may be determined according to standard ASTM D 1094.

The measurement protocol below may for example be used to evaluate the demulsification performance of the mixture of additives according to the invention or of the concentrate for fuel according to the invention containing the succinimide compound.

Measurement Protocol:

20 ml of an aqueous buffer solution and 80 ml of fuel to be tested are poured into a 100 ml graduated measuring cylinder. The graduated measuring cylinder is then stirred for 2 minutes before being placed on a flat surface. The volume of the aqueous phase located in the lower part of the measuring cylinder is then determined after 3, 5, 7, 10, 15, 20 and 30 minutes simply by reading the volume indicated on the graduated measuring cylinder.

The copolymers according to the invention have noteworthy properties as detergent additive in a liquid fuel, in particular in a gas oil or gasoline fuel.

The copolymers according to the invention are particularly noteworthy especially since they are efficient as detergent additive for a wide range of liquid fuels and/or for one or more types of engine specification and/or against one or more types of deposit which become formed in the internal parts of internal combustion engines.

In addition, the copolymers according to the invention are noteworthy in that they make it possible to improve the separation of water and fuel when the latter contains water, when they are combined with succinimide compounds, in particular polyisobutene succinimides. The demulsification performance of the mixture does not affect the detergent properties of said copolymers when they are used in a liquid fuel.

The invention claimed is:

1. A fuel composition comprising:
   (1) a fuel derived from one or more sources chosen from the group consisting of mineral, animal, plant and synthetic sources; and
   (2) from 10 to 5000 ppm of one or more copolymers obtained by copolymerization of at least:
   non-polar monomer ($m_a$) corresponding to the following formula (I)

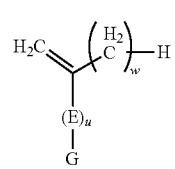

where:
   u=0 or 1,
   w=0 or 1,
   E=—O— or —NH(Z)—, or —O—CO—, or —NH—CO— or —CO—NH—, with Z representing H or a C1-C6 alkyl group, it being understood that when E=—O—CO— E is connected to the vinyl carbon by the oxygen atom, and
   G represents a group selected from the group consisting of (i) a C4-C34 alkyl, (ii) an aromatic ring, and (iii) an aralkyl comprising at least one aromatic ring and at least one C1-C34 alkyl group, and
   a polar monomer ($m_b$) chosen from those of the following formula (II):

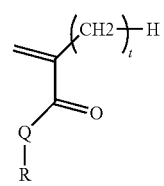

where:
   t=0 or 1,
   Q is chosen from an oxygen atom and a group —NR'— with R' being chosen from a hydrogen atom and $C_1$ to $C_{12}$ hydrocarbon-based chains, and R is a $C_1$ to $C_{34}$ hydrocarbon-based chain substituted with at least one quaternary ammonium group and optionally one or more hydroxyl groups.

2. The fuel composition as claimed in claim 1, further comprising at least one compound chosen from succinimides substituted with a hydrocarbon-based chain.

3. The fuel composition as claimed in claim 2, wherein the compound is chosen polyisobutene succinimides.

4. The fuel composition as claimed in claim 1, wherein R is a $C_1$ to $C_{34}$ hydrocarbon-based chain substituted with at least one quaternary ammonium group and one or more hydroxyl groups.

5. The fuel compostion according to claim 1, wherein the group E of the non-polar monomer ($m_a$) is chosen from —O—, —NH(Z)— with Z representing H or a C1-C6 alkyl group, and —O—CO— in which E is connected to the vinyl carbon by the oxygen atom.

6. The fuel composition according to claim 1, wherein w is equal to 0.

7. The fuel composition according to claim 1, wherein the group G is chosen from a C4-C34 alkyl.

8. The fuel composition according to claim 1, wherein the polar monomer ($m_b$) is represented by one of the following formulae (III) and (IV):

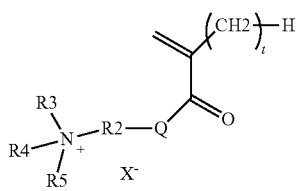

(III)

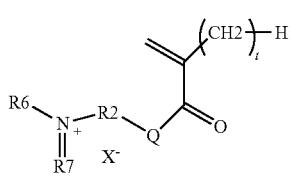

(IV)

where:
t=0 or 1,
Q is chosen from an oxygen atom and a group —NR'— with R' being chosen from a hydrogen atom and $C_1$ to $C_{12}$ hydrocarbon-based chains,
$X^-$ is chosen from hydroxide, halide ions and organic anions,
$R_2$ is chosen from $C_1$ to $C_{34}$ hydrocarbon-based chains, optionally substituted with at least one hydroxyl group,
$R_3$, $R_4$ and $R_5$ are identical or different and chosen independently from $C_1$ to $C_{18}$ hydrocarbon-based chains, it being understood that the alkyl groups $R_3$, $R_4$ and $R_5$ may contain one or more groups chosen from: a nitrogen atom, an oxygen atom and a carbonyl group and that the groups $R_3$, $R_4$ and $R_5$ may be connected together in pairs to form one or more rings, and
$R_6$ and $R_7$ are identical or different and chosen independently from $C_1$ to $C_{18}$ hydrocarbon-based chains, it being understood that the groups $R_6$ and $R_7$ may contain one or more groups chosen from: a nitrogen atom, an oxygen atom and a carbonyl group and that the groups $R_6$ and $R_7$ may be connected together to form a ring.

9. The fuel composition according to claim 1, wherein the copolymer is chosen from block copolymers and random copolymers.

10. The fuel composition according to claim 1, which is a block copolymer comprising at least:
a block A consisting of a chain of structural units derived from one or more non-polar monomers chosen from the non-polar monomers ($m_a$) of formula (I), and
a block B consisting of a chain of structural units derived from one or more polar monomers chosen from the polar monomers ($m_b$).

11. A concentrate for fuel comprising from 5 to 80% of one or more copolymers obtained to copolymerization of at least:
a non-polar monomer ($m_a$) corresponding to the following formula (I)

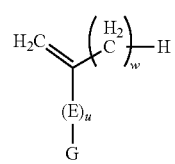

(I)

where:
u=0 or 1,
w=0 or 1,
E=—O— or —NH(Z)—, or —O—CO—, or —NH—CO— or —CO—NH—, with Z representing H or a C1-C6 alkyl group, it being understood that when E=—O—CO— E is connected to the vinyl carbon by the oxygen atom, and
G represents a group selected from the group consisting of (i) a C4-C34 alkyl, (ii) an aromatic ring, and (iii) an aralkyl comprising at least one aromatic ring and at least one C1-C34 alkyl group, and
a polar monomer ($m_b$) chosen from those of the following formula (II):

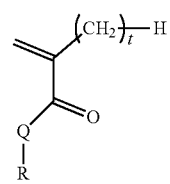

(II)

where:
t=0 or 1,
Q is chosen from an oxygen atom and a group —NR'— with R' being chosen from a hydrogen atom and $C_1$ to $C_{12}$ hydrocarbon-based chains, and
R is a $C_1$ to $C_{34}$ hydrocarbon-based chain substituted with at least one quaternary ammonium group and optionally one or more hydroxyl groups,
wherein the copolymer is in mixture.

12. The concentrate for fuel as claimed in claim 11, further comprising at least one compound chosen from succinimides substituted with a hydrocarbon-based chain, the organic liquid also being inert with respect to the compound.

13. The concentrate for fuel as claimed in claim 12, wherein the compound is chosen from polyisobutene succinimides.

* * * * *